United States Patent Office 3,321,965
Patented May 30, 1967

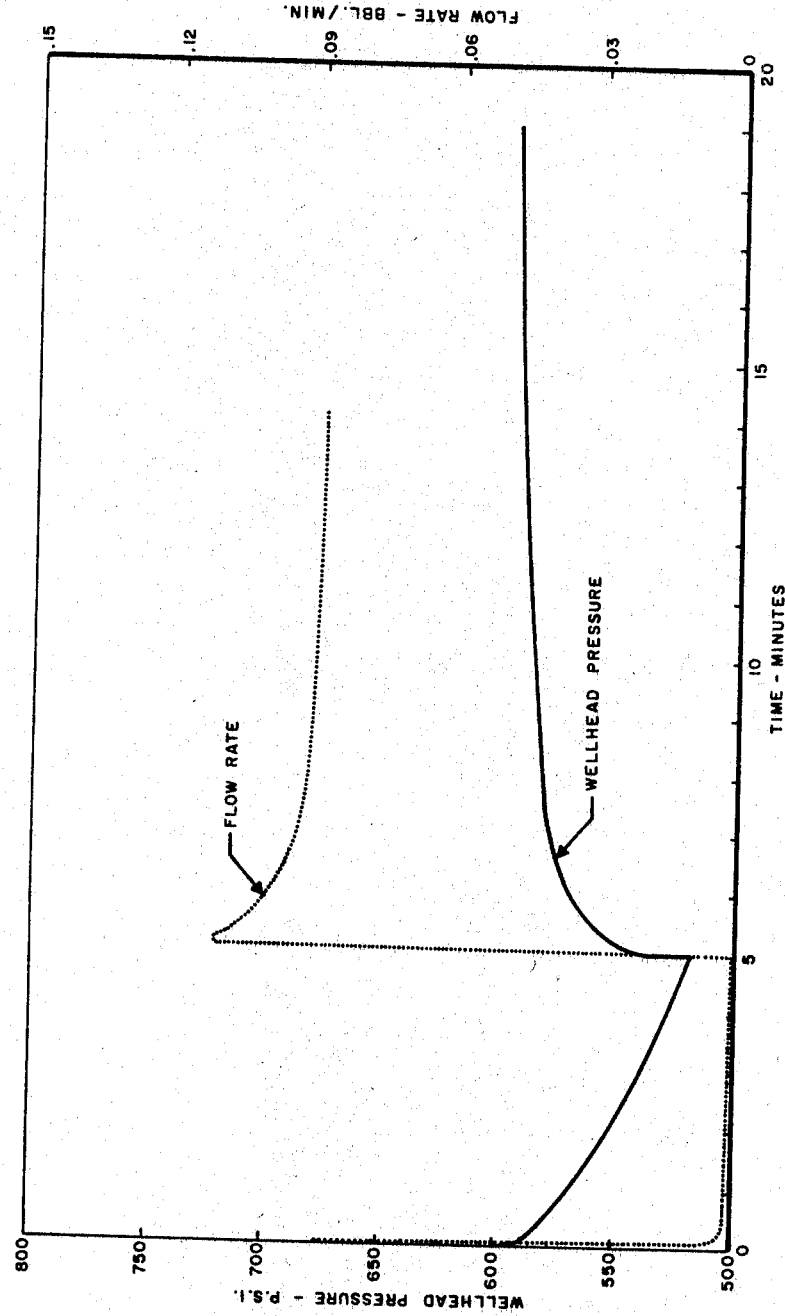

3,321,965
METHOD FOR TESTING WELLS
Carlton R. Johnson and Harold L. Graham, Tulsa, Okla., Robert A. Greenkorn, Wauwatosa, Wis., and Hans O. Jahns, Tulsa, Okla., assignors, by mesne assignments, to Esso Production Research Company, Houston, Tex., a corporation of Delaware
Filed Oct. 8, 1964, Ser. No. 402,501
7 Claims. (Cl. 73—155)

A method for determining reservoir properties near a well-bore, involving a measurement of pressure variations in the well caused by changing the rate of production or injection flow. Pressure changes as a function of time are recorded in response to a change in the rate of production or injection flow, followed by a return to the initial rate of flow. In one embodiment, a series of such tests are carried out in which either the amplitude or the duration of the flow rate change is varied in order to determine reservoir properties at different distances from the wellbore. That is, a short pulse provides the best description of the region near the well whereas progressively longer pulses are descriptive of progressively larger regions of the reservoir.

This invention relates to the testing of a well to determine reservoir properties near the well. The method involves a measurement of pressure variations in the well caused by changing the rate of production or injection flow. In a particular aspect the invention is concerned with the generation of a sequence of pressure pulses of different sizes in order to determine reservoir properties as a function of distance from the well bore. A short pulse provides the best description of the region nearest the well, whereas progressively longer pulses are descriptive of progressively larger regions of the reservoir.

Transient pressure tests of various types have been used for many years in the testing of oil and gas wells, and water wells, to determine reservoir properties. A common example is the pressure build-up test, obtained by shutting in a well which has been producing at a constant rate for an extended period of time. The bottom-hole pressure is measured prior to shut-in, and the subsequent pressure increases upon closing the well are recorded as a function of the shut-in time.

In order to calculate both the permeability-thickness product of the reservoir, and the well bore damage or improvement in the immediate vicinity of the well, it has been considered necessary heretofore to keep the well closed and to continue recording pressure changes until a logarithmic portion of the curve is established. Usually, the shut-in time required to establish the characteristic stright-line relationship (on semi-log paper) will exceed 10 hours. In many instances several days may be required. Keeping the well shut in for this length of time can be a considerable disadvantage. Moreover, a further disadvantage is incurred due to the necessity of minimizing pressure disturbances at other wells in the general area of the test well for the same period of time.

Sometimes the build-up test is subject to a more serious shortcoming. For example, field experience has shown that the build-up curve does not always reach linearity with respect to the logarithm of time, in which case a useful interpretation of the results may be entirely obscured. Such failure is presumably due to extensive heterogeneties in the reservoir structure.

It is perhaps a disconcerting aspect of the build-up test that the hererogeneities which sometimes cause failure may be located hundreds of feet from the test well. Thus, the desirability of a test procedure which can be completed without substantial influence from relatively distant portions of the reservoir becomes apparent.

Other conventional transient pressure tests include the drawdown, fall-off and interference tests, each of which is subject to substantially the same disadvantages as the build-up test.

It is an object of the present invention to obtain a quantitative measure of well bore damage, i.e., reduced permeability at or near the well bore, generally caused by drilling operations, by completion practices, by production practices, or by some combination of the three.

It is a further object of the invention to obtain a quantitative measure of well bore improvement, i.e., increased permeability at or near the well bore. The permeability improvement may result from any of various stimulation treatments, such as acidizing or hydraulic fracturing.

It is a further object of the invention to obtain a quantitative determination of the permeability-thickness product of the reservoir in the vicinity of the well.

It is a further object of the invention to determine the depth of the well bore damage, if any, and to determine the effective radius of induced fractures; and the effective increase in well bore diameter caused by acidization. It is still a further object of the invention to establish the presence of and to determine the distance to reservoir discontinuities or permeability barriers.

The method of the invention is applicable in the testing of both production and injection wells, and for the testing of a shut-in well, if desired. Prior to testing, the well must be stabilized at a constant production or injection rate. A series of bottom hole pressure measurements should be obtained prior to the test in order to establish a reliable value for the pressure which corresponds to the stabilized flow rate.

Next, the flow rate is changed, preferably to a new constant value, either below or above the original stabilized rate. Beginning simultaneously with the change in flow rate, the transient pressure response caused by the rate change is carefully measured. After a short period of time, which may be as little as 10 seconds, but preferably at least 3 minutes, the flow rate is readjusted to the initial, stabilized value. The measurement of the transient pressure response is continued until the pressure is also again stabilized at a value which corresponds substantially to the initial pressure at the beginning of the test. Thus, the test can be completed within only a few minutes after a stabilized initial flow rate and pressures are established. Moreover, the accuracy and reliability of the test are unaffected by portions of the reservoir which lie beyond the selected scope of the test.

The input pulse amplitude is the difference between the initial and the adjusted rates of flow. A suitable pulse amplitude is generated by a change in the flow rate ranging from 1 barrel per hour up to as much as 100 barrels per hour or more, depending primarily upon the current productivity or injectivity of the particular well to be tested. For example, a production well which is capable of producing at a maximum rate of 1 barrel per hour offers little flexibility in the choice of pulse amplitude, since a complete shut-in provides only 1 barrel per hour change in flow rate. Similarly, an injection well may be taking only 1 barrel per hour of water at a pressure just below that required to fracture the formation, in which case a complete shut-in generates an input pulse amplitude of 1 barrel per hour.

On the other hand, a well which is producing fluids at the rate of 100 barrels per hour is conveniently tested by generating an input pulse amplitude of about 10 barrels per hour. Thus, it is readily seen that the method of the present invention usually requires no substantial interruption of production or injection schedules. It is within the scope of the invention, however, to generate a pulse of large amplitude, for example, by shutting in a 100-barrel per hour flow and measuring the resulting pressure transient.

The duration of the pulse is the time interval during which the adjusted flow rate is maintained. Suitable pulse durations fall within the range of about 10 seconds up to as much as 1 hour or more, depending primarily upon the operator's choice as to how large a region of the reservoir is to be included in the test. If a test is being run to determine the reservoir character within only a few feet of the well bore, then a relatively short pulse is not only adequate, but is actually required. A pulse of longer duration is required to determine the character of a larger region of the reservoir. Thus, in accordance with a more limited embodiment of the invention, a series of pulses of different durations are generated sequentially at a given well. The corresponding transient pressure response at the well is recorded in each instance, giving rise to a series of determinations of average permeability-thickness products, for example, each average corresponding to a different radius of investigation. In this maner, variations in permeabilty-thickness are determined as a function of distance from the well.

During the generation of a pulse, the flow rate and pressure measurements are usually made at the wellhead. Due to the compressibility of fluids in the well bore, a pulse will undergo some change in its shape and size when traveling through the well bore. This change is slight when the well bore is liquid-full, and may be ignored in the generation of a large pulse. However, when a short pulse is used, and particularly when the well bore contains gas, best results are obtained by correcting for the well bore effect.

A particularly suitable method for obtaining the correction involves the step of setting a down-hole packer to seal the borehole just above the formation. Then a small flow pulse is generated at the well head, and pressure measurements are made to determine the transient pressure response of the well bore alone. Subsequently, with the packer removed, a pulse having the same amplitude and duration as before is generated and the pressure response recorded. The difference in response between the two tests is attributed to the reservoir, and is used to calculate reservoir properties near the well.

A complete example of the invention is illustrated in connection with the accompanying drawing. The well selected for testing was stabilized at an injection flow rate of approximately 0.09 barrel per minute, and a well head pressure of about 600 pounds per square inch. At zero time, as indicated on the drawing, the well was closed in. Almost immediately, as indicated by the dotted curve, the flow rate dropped to near zero. Of course, at the well head the flow rate did drop to zero; however, the dotted curve represents the flow rate at the sand face, which includes a significant volume of "after-flow," as readily understood by one skilled in the art.

The well head pressure, as indicated by the solid curve, dropped much more slowly than the flow rate. For the first five minutes of closed-in time the plot of well head pressure was that which would be obtained in a conventional pressure fall-off test. It would take many hours, and perhaps several days, of closed-in time for a pressure fall-off curve to attain logarithmic decline, which is essential in the successful completion of a conventional test. In accordance with the procedure of the present invention, however, at the end of 5 minutes closed-in time the well was opened, and the initial flow rate was re-established as quickly as possible. Initially, the flow rate exceeded the original stabilized value, reaching a maximum rate of approximately 0.11 barrel per minute. Once the well head pressure began to approach the initial stabilized value, the flow rate rapidly approached the original value. After just 14 minutes of total elapsed time since the well was first closed in, the flow rate had again been stabilized at the original value. Shortly thereafter, the well head pressure had also become stabilized at substantially the original value. Thus the test was completed in less than 20 minutes, whereupon the injection well was returned to its normal operating schedule.

From this test data it was determined that the reservoir in the vicinity of the well has an average permeability of about 10 millidarcies. It was also determined that the well has an effective radius of about 12 feet, due to a hydraulic fracturing treatment carried out sometime prior to the test. The actual well bore radius is only 3.5 inches.

Analysis of pulse data from porous media is facilitated by taking Laplace or Fourier transforms of the observed data. By this means, the observed functions of pressure (or rate) versus time are transformed into a single numerical value. The same transforms also eliminate time as a variable in the diffusion equation; hence, solutions to the transformed equtaions are obtained more easily.

The transform $\bar{p}$ of a function $p(t)$ is defined by $$\bar{p}(s) = \int_0^\infty e^{-st} p(t)\, dt \tag{1}$$

where $t$ denotes time and $s$ is the "Laplace parameter." Equation 1 defines the Laplace Transform when $s$ is real and positive; it defines the Fourier Transform, when $$s = i\omega \tag{2}$$

with $\omega$, the "frequency," being real and positive.

In order to take the transform of a measured time function, the integral in Equation 1, in general, has to be evaluated numerically; this is easily done on a modern electronic computer.

The diffusion equation for porous media with constant thickness $h$ is given by $$\nabla T \nabla p = S \frac{\delta p}{\delta t} \tag{3}$$

where $T$ is the transmissibility, $kh/\mu$, and $S$ the storage factor $\phi$ ch, both of which may vary with location; and $p$ is the pressure. The transform of (3) is $$\nabla T \nabla \bar{p} = sS\bar{p} \tag{4}$$

In one dimension, Equation 4 reads $$\frac{d}{dx}\left(T \frac{d}{dx}\bar{p}\right) = sS\bar{p} \tag{5}$$

for linear flow, and $$\frac{1}{r}\frac{\delta}{\delta r}\left(Tr \frac{\delta}{\delta r}\bar{p}\right) = sS\bar{p} \tag{6}$$

for radial flow.

Equations 5 and 6 have analytical solutions for homogeneous porous media, i.e., when $T$ and $S$ are constants. They are of the form $$\bar{p}(r, s) = A \exp\left(-\sqrt{\frac{s}{D}}x\right) + B \exp\left(+\sqrt{\frac{s}{D}}x\right) \tag{7}$$

for linear flow, and $$\bar{p}(r, s) = A K_o\left(\sqrt{\frac{s}{D}}r\right) + B I_o\left(\sqrt{\frac{s}{D}}r\right) \tag{8}$$

for radial flow. $A$ and $B$ are integration constants which have to be determined from boundary conditions. $K_o$ and $I_o$ are the modified BESSEL-Functions of zero order.

$D = \dfrac{T}{S}$ is the diffusivity.

Equations 7 and 8 can be used to calculate the diffusivity $D$ when $\bar{p}$ is known from pressure measurements at an observation point $x$ or $r$. In general, this has to be done by trial and error or by graphical methods. In some cases, however, Equation 7 can be solved for $D$ explicitly.

Equation 8 can be applied to pulse data obtained from oil fields, when $r$ measures the distance from the center of the pulsed well. In many cases, the formation can be considered infinite; then, in order for the pressure response to become negligible as $r$ increases, the second integration constant B must be zero and Equation 8 simplifies to $$\bar{p}(r, s) = AK_0\left(\sqrt{\frac{s}{D}}r\right) \quad (9)$$

If the pressure is measured at two different points, e.g., in the pulsed well of radius $r_w$ and in a responding well at a distance $r$, from Equation 9

$$\frac{\bar{p}(r, s)}{\bar{p}(r_w, s)} = \frac{K_0\left(\sqrt{\frac{s}{D}}r\right)}{K_0\left(\sqrt{\frac{s}{D}}r_w\right)} \quad (10)$$

If the rate $q(r_w)$ is measured in the pulsed well, then we have from Darcy's law $$\bar{q}(r_w, s) = -2\pi r_w T\left(\frac{\delta\bar{p}}{\delta r}\right)_{r_w} \quad (11)$$

where $\bar{q}$ is the transform of $q$.

From Equations 10 and 11

$$\frac{\bar{p}(r, s)}{\bar{q}(r_w, s)} = \frac{K_0\left(\sqrt{\frac{s}{D}}r\right)}{2\pi r_w T K_1\left(\sqrt{\frac{s}{D}}r_w\right)} \quad (12)$$

Equations 10 and 12 have been solved for D. Two different values of the Leplace parameter $s$ are necessary to solve Equation 12 for both T and D.

A graphical solution, using Fourier transforms, is suitable for the special case $r = r_w$ of Equation 12, i.e., the present invention, in which both rate and pressure are measured in the same well.

What is claimed is:

1. A method for testing a well to determine reservoir properties near the well which comprises establishing a stabilized flow rate and pressure at the well, then changing the rate of flow of the well and recording pressure changes as a function of time caused by the change in flow rate, thereafter returning the flow rate to the initial stabilized value, and continuing to record pressure changes with respect to time until the initial stabilized pressure is substantially re-established.

2. A method as defined by claim 1 wherein said well is a producing well.

3. A method as defined by claim 1 wherein said well is an injection well.

4. A method for testing a well to obtain a quantitative determination of the permeability-thickness product of the reservoir in the vicinity of the well which comprises establishing a stabilized flow rate at the well and a corresponding stabilized pressure, then changing said rate of flow while recording pressure changes with respect to time caused by said change in flow rate, thereafter re-establishing said stabilized flow rate at the well while continuing to record pressure changes with respect to time until said stabilized pressure is substantially re-established at the well, and calculating the permeability-thickness product at the reservoir in the vicinity of the well by a comparison of the flow rate versus time relationship, and the pressure transient.

5. A method for testing a well to determine the reservoir properties in the immediate vicinity of the well which comprises sealing off the wellbore just above the formation to be tested, recording the well head pressure, injecting a small volume of fluid into the wellbore, recording the corresponding pressure change in the wellbore, then removing a volume of fluid equal to the injected volume while continuing to record the corresponding changes in pressure, thereafter opening the wellbore to permit fluid communication with the formation to be tested, establishing a stabilized flow rate into the formation and recording the stabilized pressure at the well head corresponding to said stabilized injection rate, then changing the injection rate and recording pressure changes with respect to time caused by said change in rate, thereafter re-establishing said initial stabilized injection rate while continuing to record pressure changes with respect to time until said initial stabilized pressure is substantially re-established at the well head, then correcting the transient pressure response obtained with the formation in communication with the wellbore to eliminate the effect due to compressibility of wellbore fluids, whereby the reservoir characteristics in the immediate vicinity of the wellbore may be determined independently of the wellbore effect.

6. A method for testing a well in order to determine a quantitative measure of reservoir properties as a function of distance from the well which comprises establishing a stabilized flow rate at the well, recording the corresponding stabilized pressure, then changing the flow rate a first amount, recording pressure changes with respect to time caused by said first change in flow rate, thereafter re-establishing the initial stabilized flow rate while continuing to record pressure changes with respect to time until the initial stabilized pressure is substantially re-established at the well, thereafter changing the flow rate a second amount, greater than before, recording pressure changes with respect to time caused by said second change in flow rate, thereafter substantially re-establishing said initial flow rate while continuing to record pressure changes with respect to time until the initial stabilized initial pressure is substantially re-established at the well, then calculating the reservoir properties characteristic of both the immediate vicinity of the well and of a larger region of the reservoir by a comparison of the first flow rate versus time relationship with the first pressure transient, then calculating the reservoir properties within a larger radius surrounding the wellbore by a comparison of the second flow rate versus time relationship with the second pressure transient.

7. A method for testing a well to determine the reservoir properties as a function of radial distance from the well which comprises establishing a stabilized flow rate at the well and recording the corresponding stabilized pressure, then pulsing the flow rate with a given amplitude and duration while recording pressure changes with respect to time until the initial stabilized pressure is re-established at the well, thereafter pulsing the flow rate with the same amplitude, but with a greater duration than before, recording pressure changes with respect to time caused by said second pulse until the initial stabilized pressure is substantially re-established at the well, then calculating the reservoir properties from a comparison of said first pulse with the first transient, and calculating the reservoir properties from said second pulse and transient, whereby a comparison of the determinations provides a determination of reservoir properties as a function of distance from the well.

References Cited

UNITED STATES PATENTS

| | | | |
|---|---|---|---|
| 2,320,492 | 6/1943 | Walker | 73—155 |
| 2,818,728 | 1/1958 | Hartline et al. | 73—155 |

RICHARD C. QUEISSER, *Primary Examiner.*

J. W. MYRACLE, *Assistant Examiner.*